United States Patent Office 3,526,999
Patented Sept. 8, 1970

3,526,999
CUTTING BLADES
Leopold Jägers, 115 Munstereifeler Str.,
535 Euskirchen, Germany
Filed Aug. 8, 1968, Ser. No. 751,135
Int. Cl. B24d 5/12
U.S. Cl. 51—206                3 Claims

ABSTRACT OF THE DISCLOSURE

A circular cutting blade, which is adapted to be rotated about its axis, has two axial end faces one of which is planar. The cutting blade has a central portion and a circumferentially complete marginal edge portion and intermediate the axial end faces it has a thickness which increases in direction from the center portion to the circumferential edge portion.

BACKGROUND OF THE INVENTION

The present invention relates to a circular cutting blade of the non-toothed type, and more specifically to a circular cutting blade consisting of abrasive material. Still more specifically the invention relates to a circular cutting blade consisting of abrasive granular material bound together by a suitable binder, such as metal or a synthetic plastic resin.

Cutting blades of this type, wherein for example corundum particles are bound with a suitable binder, are already known. They are used particularly for slicing through metal and rocks. Usually they contain a centrally positioned reinforcing insert of a suitable fabric. By contrast to circular saw blades the circumferential edge of such blades is not provided with saw teeth.

Known cutting blades of this type are of constant thickness throughout, the thickness usually being on the order of 1% of the cutting blade diameter. Thus, both axial end faces of the cutting blade extend in parallel planes. The problem with this type of construction is the fact that, particularly when thick workpieces are to be severed, there develops a very strong friction between the surface areas of the axial end faces and the workpiece being severed, this being the result of the fact that both axial end faces are located in parallel planes and the resulting surface-to-surface contact thus takes place over large surface areas. To overcome this friction, cutting blades of this type require the use of strong drive means, and it will be appreciated that such friction can be overcome only with a concomitant significant rise in the temperature of the cutting blade and the workpiece. This, of course, is frequently highly undesirable just as the necessity to provide exceptionally strong drive means to overcome the friction is uneconomical.

It is thus a general object of the present invention to overcome these disadvantages.

A more particular object of the invention is to provide a cutting blade of the type in question which requires less motive energy for its operation than known herebefore, and which is not subject to the strong rise in temperature during its operation which is experienced by the known cutting blades of this type.

SUMMARY OF THE INVENTION

Pursuant to the above objects, and others which will become apparent hereafter, one feature of my invention resides in the provision of a circular cutter disc, hereafter also identified as a cutting blade, adapted to be rotated about its axis and having two axial end faces, one of which is planar. The cutting blade has a central portion and a circumferential marginal edge portion and intermediate its end faces it has a thickness which increases in direction from the central portion of the circumferential edge portion.

In other words, the one end face is palnar whereas the other end face is not planar, but is rather inclined radially outwardly from the central portion towards the circumferential marginal edge portion and in axial direction away from the planar end face. The inclination will be provided in a circular marginal portion whose radial width is approximately one-fourth to one-sixth of the diameter of the cutting blade.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
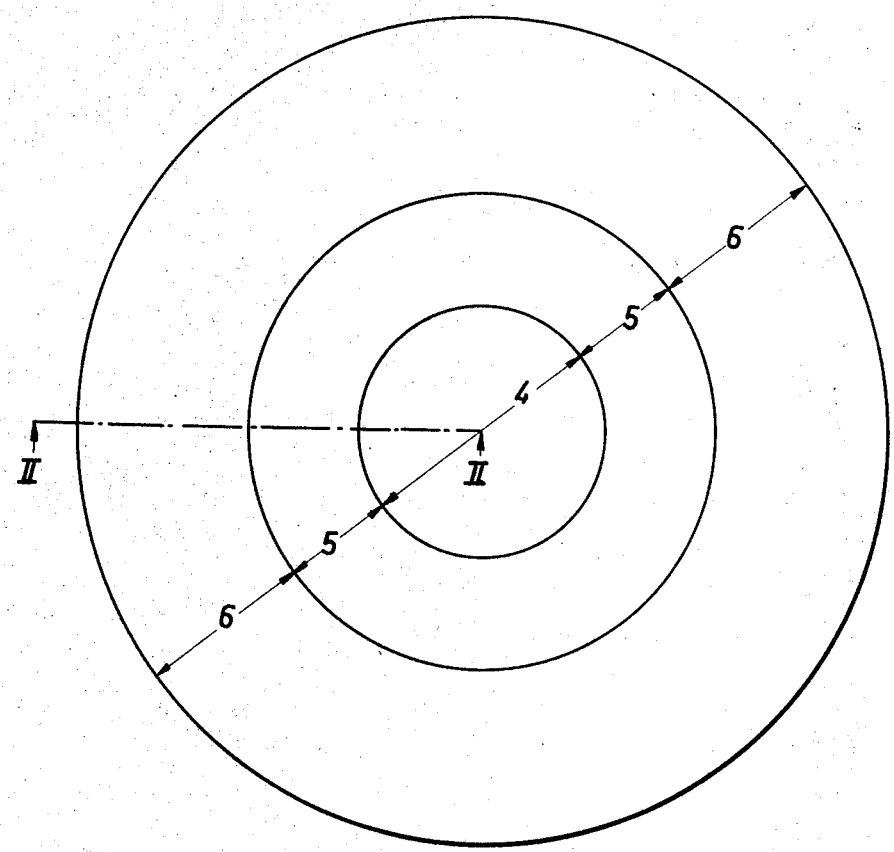
FIG. 1 is a diagrammatic plan view of a cutting blade embodying my invention.

The cutter disc or cutting blade illustrated by way of example in the drawing is generally identified with reference character B. It is of circular outline, which is of course conventional. As is also conventional, my cutting blade may comprise a sturdy fabric-layer insert 1 onto the opposite sides of which there is applied a mixture 2 which may consist of suitable abrasive material, for example, corundum particles bound by a suitable binder material, for instance a synthetic plastic resin which hardens upon being subjected to elevated temperatures. After the mixture is applied in the conventional manner, the construction is subjected to pressure and to elevated temperature, which is selected with a view towards the particular binder used, for instance ranging between 200 and 300° C. in dependence upon the particular synthetic plastic resin which may be employed. The peripheral edge of the blade B is not provided with teeth, and is thus circumferentially complete.

Figure 2:
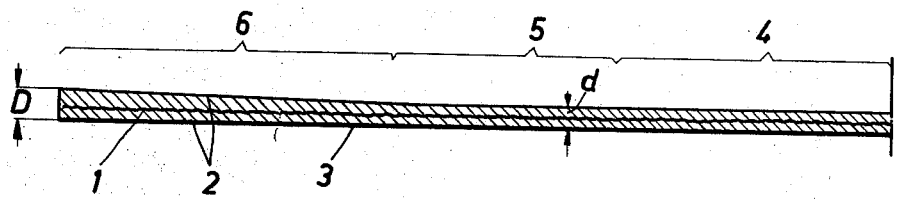
FIG. 2 is a fragmentary section, on an enlarged scale, taken on the line II—II of FIG. 1.

In accordance with my invention, one axial end face of the resulting circular cutter blade B, namely the one identified in FIG. 2 with reference numeral 3, is completely planar. The other axial end face, identified with reference numeral 3a in FIG. 2, is not planar, however. As FIGS. 1 and 2 show, the axial end face 3a is planar only in a central zone 4 which concentrically surrounds the axis of rotation (coincident with the inner end of the section line II—II in FIG. 1). Radially outwardly the zone 4 is joined by a zone 5 which annularly surrounds the zone 4. The zone 5 in the illustrated embodiment is also planar. Finally, there is a zone 6 which annularly surrounds the zone 5 and constitutes a circumferential marginal edge zone of the cutter blade B. Whereas in the zones 4 and 5 the thickness $d$ (compare FIG. 2) of the cutter blade B is constant, it increases conically from the outer circumferential edge of the zone 5 throughout the zone 6 in radial direction until at the outer edge of the cutter blade B the thickness is greatest, having a value identified with reference character D.

In accordance with my invention the radial width of the zone 6 in the illustrated embodiment is one-fifth of the diameter of the cutter blade B; however, it may range between approximately one-quarter and approximately one-sixth of the diameter. In the illustrated embodiment the thickness D is greater by 0.3% than the thickness $d$. This corresponds approximately to a cone angle of 1°, that is the angle included between the planes of the zones 4, 5 and the zone 6.

With this construction, in which only the surface 3a rises radially and axially in the manner just discussed and illustrated, whereas the surface 3 is completely planar, the problems discussed above with respect to the prior art are overcome. The greater thickness of the cutter blade B according to the present invention at the marginal edge thereof assures that in operation, that is when the blade B is used to sever workpieces, only this marginal edge actually comes in contact with the material of the workpiece through which it is to slice, whereas there is no contact between the remainder located inwardly of the marginal edge and the workpiece. Accordingly, friction between the inwardly located portions of the cutter blade B and the workpiece is avoided, thus reducing the energy requirements needed for rotating the cutter blade B and significantly reducing the extent to which the cutter blade B becomes heated as a result of such friction. Because the entire marginal zone 6 is of the illustrated conicity, the increased thickness of the marginal edge of the cutter blade B over the thickness in the zones 4 and 5 remains unaffected even if and when during use portions of the marginal zone 6 are eventually worn away so that the diameter of the blade B decreases.

Use of my novel cutter blade B makes it possible to sever from a long workpiece a great number of exactly identical sections, regardless of how far the diameter of the blade B has been decreased as a result of wear. It is simply necessary to so arrange the cutter blade B with reference to the workpiece that the planar surface 3 faces the front end of the workpiece, as seen in the direction of advancement of the latter.

My cutter blade B can be produced by resorting to the methods which are conventional for the production of cutter blades of this general type. Conventionally, cutter blades of this type are produced in a form into which the granular material with the binder is introduced to be subsequently compressed and heated. To make my novel cutter blade B it is simply necessary to similarly introduce some of the granular material with binder into such a form which latter, however, in this case will have a bottom wall corresponding to the desired configuration of the surface 3a. After a requisite quantity of material has been introduced into the form the layer 1 may be inserted, or it may be omitted if desired, and additional material is then introduced until the desired thickness $d$ is reached. Thereupon, conventional compression and heating of the construction follows and the resulting cutter blade is the one illustrated in FIGS. 1 and 2.

It will be understood that each of the elements described above, or two or more together, may also find a useful application in other types of constructions differing from the types described above.

While the invention has been illustrated and described as embodied in a cutter blade, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A circular cutter disc adapted to be rotated about its axis and having a predetermined diameter, said cutter disc consisting of particulate abrasive material and having a planar first and a second axial end face the latter of which includes a central portion and a circumferentially complete outer peripheral marginal portion whose radial width corresponds to between ¼ and ⅙ of said predetermined diameter, said cutter disc further having intermediate said end faces a thickness on the order of substantially 1% of said predetermined diameter and which increases in direction from the radially inner to the radially outer edge of said marginal portion.

2. A cutter disc as defined in claim 1, wherein said thickness increases conically.

3. A cutter disc as defined in claim 2, wherein the general planes of said central and marginal portions include with one another a cone angle on the order of 1%.

References Cited

UNITED STATES PATENTS 2,032,395  3/1936  Bley _____ 125—15 X
3,229,736  1/1966  Hallock _____ 143—133

OTHELL M. SIMPSON, Primary Examiner

U.S. Cl. X.R.

125—15; 143—133